United States Patent [19]

Baron et al.

[11] 4,065,316

[45] Dec. 27, 1977

[54] PRINTING INK

[75] Inventors: William James Baron, Franklin Township, Somerset County; Patrick John Capano, East Windsor, both of N.J.

[73] Assignee: Western Electric Company, Incorporated, New York, N.Y.

[21] Appl. No.: 742,484

[22] Filed: Nov. 17, 1976

Related U.S. Application Data

[63] Continuation-in-part of Ser. No. 706,655, July 19, 1976, abandoned.

[51] Int. Cl.² .................... C09D 3/52; C09D 3/58
[52] U.S. Cl. ......................... 106/20; 106/22; 106/23; 106/27; 106/28; 260/39 P; 260/834
[58] Field of Search ............... 260/39 P, 834; 106/20

[56] References Cited

U.S. PATENT DOCUMENTS

| | | | |
|---|---|---|---|
| 2,498,454 | 2/1950 | Schibler | 260/39 P X |
| 3,011,920 | 12/1961 | Shipley | 117/213 |
| 3,532,518 | 10/1970 | D'Ottavio | 106/1 |
| 3,657,003 | 4/1972 | Kenney | 117/120 |
| 3,766,110 | 10/1973 | Curado et al. | 260/834 X |
| 3,803,095 | 4/1974 | Calbo et al. | 260/70 A |
| 3,847,649 | 11/1974 | Sova | 117/47 |

*Primary Examiner*—Sandra M. Person
*Attorney, Agent, or Firm*—J. Rosenstock

[57] ABSTRACT

A printing ink is disclosed. The ink comprises (a) a reactive resin combined with a second resin comprising a substantially anhydrous water-soluble thermosetting stable methylated urea-formaldehyde resin wherein the weight of the methoxyl substituents therein is between 28% and 40% of the weight of the resin and the molar ratio of the reacted formaldehyde in the resin to the methoxyl substituents is such that in the absence of organic solvent the resin at 25° C. is soluble to the extent of at least 50% by weight in water and dissolves at least 50% of its weight of toluene, the polymeric form of the resin being not substantially in excess of tetrameric, the molar ratio of reacted urea to reacted formaldehyde in the resin and the molar ratio of reacted formaldehyde to reacted methanol therein being within the ranges:

| | Molar ratio | | | | |
|---|---|---|---|---|---|
| Ranges | Urea | :CH$_2$O | :CH$_3$OH | CH$_2$O | :CH$_3$OH |
| Lower | 1 | 2.2 | 1.3 | 1 | 1.10 |
| Upper | 1 | 2.8 | 2.0 | 1 | 2.15 | and the resin consisting essentially of

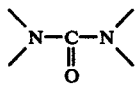

units, —CH$_2$ bridges between the units, and —H, —CH$_2$OH, and —CH$_2$OCH$_3$ substituents; and (b) a pigment.

33 Claims, 2 Drawing Figures

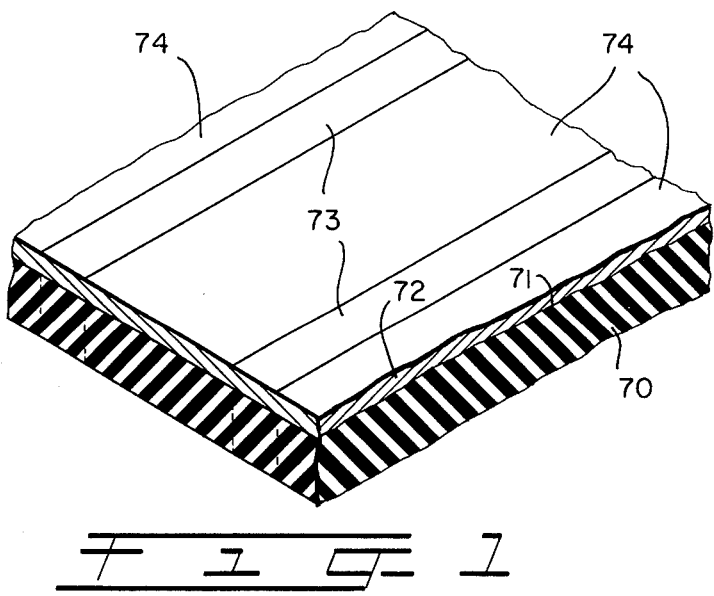
_Fig. 1_
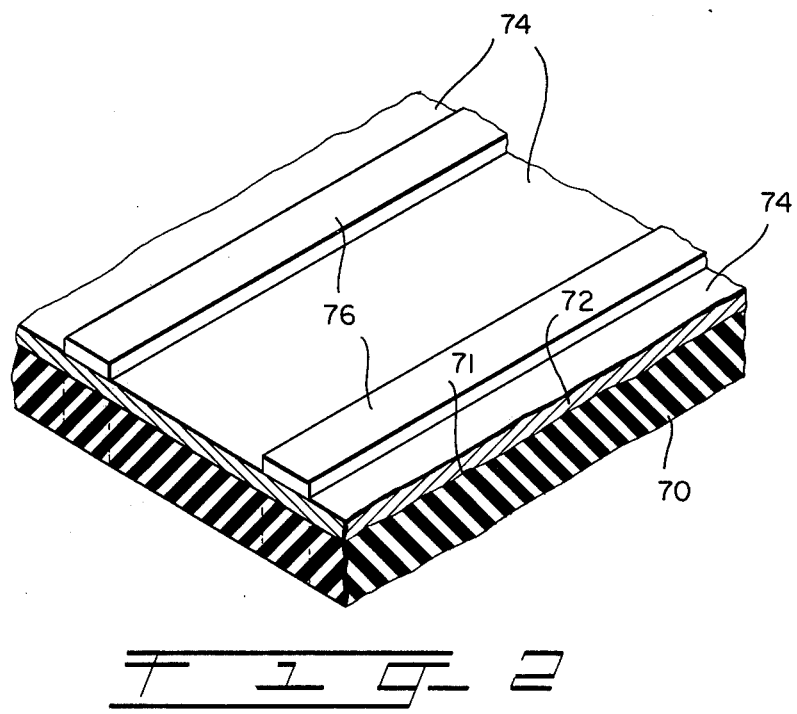
_Fig. 2_

PRINTING INK

CROSS REFERENCE TO RELATED APPLICATION

This is a continuation-in-part of co-pending application Ser. No. 706,655, filed July 19, 1976 and now abandoned.

BACKGROUND OF THE INVENTION

1. Field of the Invention

This invention relates to a printing ink and more particularly, to a solventless printing ink containing at least a reactive resin combined with a second resin comprising a stable methylated urea-formaldehyde resin.

2. Description of the Prior Art

In the printing industry there are efforts being made to formulate effective, solvent-free printing inks. The rapid drying heatset inks used in the printing industry today contain a high percentage of volatile solvents. With increasing printing speeds, it has been necessary to increase the volatility of the solvent to yield a more rapid drying. This has resulted, among other things, in a problem of atmospheric pollution. A solventless, odorless ink having fine resolution properties is therefore needed and is desired.

Printing techniques are presently being investigated in the printed wiring board industry to fabricate printed circuits in an additive fashion, i.e., without etching procedures. A printing ink capable of functioning in an additive printed circuit process is desirable.

SUMMARY OF THE INVENTION

The present invention is directed to a printing ink and more particularly, to a solventless printing ink containing at least a reactive resin combined with a second resin comprising a stable methylated urea-formaldehyde resin.

The ink comprises (a) a reactive resin combined with a second resin comprising a substantially anhydrous water-soluble thermosetting stable methylated urea-formaldehyde resin wherein the weight of the methoxyl substituents therein is between 28% and 40% of the weight of the resin and the molar ratio of the reacted formaldehyde in the resin to the methoxyl substituents is such that in the absence of organic solvent the resin at 25° C. is soluble to the extent of at least 50% by weight in water and dissolves at least 50% of its weight of toluene, the polymeric form of the resin being not substantially in excess of tetrameric, the molar ratio of reacted urea to reacted formaldehyde in the resin and the molar ratio of reacted formaldehyde to reacted methanol therein being within the ranges:

| Ranges | Molar ratio | | | | |
|---|---|---|---|---|---|
| | Urea | :CH₂O | :CH₃OH | CH₂O | :CH₃OH |
| Lower | 1 | 2.2 | 1.3 | 1 | 1.10 |
| Upper | 1 | 2.8 | 2.0 | 1 | 2.15 | the resin consisting essentially of

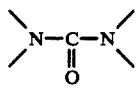

units, —CH₂ bridges between the units, and —H, —CH₃OH, and —CH₂OCH₃ substituents; and (b) a pigment.

BRIEF DESCRIPTION OF THE DRAWINGS

The present invention will be more readily understood by reference to the following drawing taken in conjunction with the detailed description, wherein:

FIG. 1 is a partial isometric view of a portion of a typical substrate having a surface coated with a catalytic layer upon which a first ink pattern has been deposited; and FIG. 2 is a partial isometric view of the portion of the substrate of FIG. 1 after a metallic pattern has been deposited thereon.

DETAILED DESCRIPTION

The present invention will be discussed in terms of a solventless printing ink which is printed on a surface by a letterset or dry offset printing technique. It will be readily appreciated that the inventive concept is equally applicable to printing on a surface using conventional printing techniques such as lithographic, letterpress, gravure set and screen printing.

A suitable reactive resin is selected. A suitable reactive resin is one having a reactive group in its skeletal structure, such reactive groups typically including the oxirane group (or epoxy group),

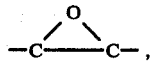

the hydroxyl group, —OH, and a combination thereof. Some typical reactive resins include epoxy resins which are those materials possessing more than one vicinal oxirane or epoxy group. These compounds may be saturated or unsaturated, aliphatic, cycloaliphatic, aromatic or heterocyclic, and may be substituted, if desired, with non-interfering substituents such as chlorine, hydroxy groups, ether radicals and the like. The polyepoxides may be monomeric or polymeric. The epoxy group may be terminal or non-terminal. The polyepoxides are often referred to in terms of their epoxy equivalency. The term "epoxy equivalency" refers to the number of epoxy groups contained in the average molecule of the desired material. The epoxy equivalency is obtained by dividing the average molecular weight of the polyepoxide by the epoxide equivalent weight.

If the polyepoxides are single monomeric compounds having all of their epoxide groups intact, their epoxy equivalency will be whole integers, such as 2, 3, 4, and 5. However, in the case of the polymeric-type polyepoxides, many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

The monomeric-type polyepoxide compounds may be exemplified by the following: vinylcyclohexene dioxide, epoxidized soybean oil, butadiene dioxide, 1,4-bis (2,3-epoxypropoxy) benzene, 1,3-bis(2,3-epoxypropoxy) benzene, 4,4'-bis(2,3-epoxypropoxy) diphenyl ether, 1,8-bis(2,3-epoxypropoxy) octane, 1,4-bis(2,3-epoxypropoxy) cyclohexane, 4,4'-bis(2-hydroxy-3,4- epoxybutoxy) diphenyldimethylmethane, 1,3-bis(4,5-epoxypentoxy)-5-chlorobenzene, 1,4-bis(3,4-epoxybutoxy)-2-chlorocyclohexane, diglycidyl ether, 1,3-bis(2-hydroxy-3,4-epoxybutoxy) benzene, 1,4-bis(2-hydroxy-4,5-epoxypentoxy) benzene, 1,2,5,6-di-epoxy-3-hexyne, 1,2,5,6-di-epoxyhexane, and 1,2,3,4-tetra(2-hydroxy-3,4-epoxybutoxy) butane.

Other examples of this type include the glycidyl polyethers of the polyhydric phenols obtained by reacting a polyhydric phenol with a great excess, e.g., 4 to 8 mols excess, of a halogen-containing epoxide in an alkaline medium. Polyhydric phenols that can be used for this purpose include bis-phenols, resorcinol, catechol, hydroquinone, methyl resorcinol, or polynuclear phenols, such as 2,2-bis(4-hydroxyphenyl) butane, 4,4'-dihydroxybenzophenone, bis(4-hydroxyphenyl) ethane, and 1,5-di-hydroxynaphthalene. The halogen-containing epoxides may be further exemplified by 3-chloro-1,2-epoxybutane, 3-bromo-1,3-epoxyhexane, 3-chloro-1,2-epoxyoctane and the like.

Examples of the polymeric-type polyepoxides include the polyepoxypolyhydroxy polyethers obtained by reacting, preferably in an alkaline or an acid medium, a polyhydric alcohol or polyhydric phenol with a polyepoxide, such as the reaction product of glycerol and bis(2,3-epoxypropyl) ether, the reaction product of sorbitol and bis(2,3-epoxy-2-methylpropyl) ether, the reaction product of pentaerythritol and 1,2-epoxy-4,5-epoxypentane, the reaction product of bis-phenol and bis(2,3-epoxy-2-methylpropyl) ether, the reaction product of resorcinol and bis(2,3-epoxypropyl) ether, and the reaction product of catechol and bis(2,3-epoxypropyl) ether.

A further group of the polymeric polyepoxides comprises the hydroxy-substituted polyepoxide polyethers obtained by reacting, preferably in an alkaline medium, a slight excess, e.g., 0.5 to 3 mol excess, of a halogen-containing epoxide, as described above, with any of the aforedescribed polyhydric phenols, such as resorcinol, catechol, bis-phenol, bis(2,2'-dihydroxy-dinaphthyl) methane and the like.

Also included within this group are the polyepoxy polyethers obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethyleneglycol, butylene glycol and the like, and subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen peroxy compound, actinic light and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl-2,3-epoxypropyl ether), poly(2,3-epoxypropyl crotonate), allyl-2,3-epoxypropyl etherstyrene copolymer, methallyl-3,4-epoxybutyl ether-allyl benzoate copolymer, poly(vinyl-2,3-epoxypropyl ether), allyl glycidyl ether-vinyl acetate copolymer and poly(4-glycidyloxystyrene).

Examples of the non-terminal polyepoxides include epoxidized esters of polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoiate, butyl eleostarate, monoglycerides of tung oil fatty acids, monoglycerides of soybean oil, sunflower, rapeseed, hempseed, sardine, cottonseed and the like.

Another group of non-terminal polyepoxides includes the epoxidized esters of unsaturated monohydric alcohols and polycarboxylic acids, such as, for example, di(2,3-epoxybutyl) adipate, di(2,3-epoxybutyl) oxalate, di(2,3-epoxyheptyl) succinate, di(2,3-epoxybutyl) maleate, di(2,3-epoxyoctyl) pimelate, di(2,3-epoxypropyl) phthalate, di(2,3-epoxycyclohexyl) adipate, di(2,3-epoxypentyl) thiodipropionate, di(5,6-epoxytetradecyl) diphenyldicarboxylate, di(3,4-epoxyheptyl) sulfonyldibutyrate, tri(2,3-epoxypropyl) 1,2,4-butanetricarboxylate, di(5,6-epoxypentadecyl) tartarate, di(4,5-epoxytetradecyl) maleate, di(3,4-epoxybutyl) citrate, and di(4,5-epoxyoctadecyl) malonate. Particular members of this group comprise the glycidyl esters, such as the glycidyl esters of the dicarboxylic acids preferably containing from 2 to 18 carbon atoms, such as diglycidyl phthalate, diglycidyl maleate, diglycidyl adipate, diglycidyl sebacate, diglycidyl cyclohexandedicarboxylate and the like.

Another group of the polyepoxides includes the epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxy-cyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials includes epoxidized derivatives of polyethylenically unsaturated polycarboxylic acids such as, for example, dimethyl 8,9,12,13-diepoxyeicosanedioate,
dibutyl 7,8,11,12-diepoxyoctadecanedioate,
dioctyl 10,11-diethyl-8,9,12,13-diepoxyeiconsanedioate,
dihexyl 6,7,10,11-diepoxyhexadecanedioate,
didecyl 9-epoxy-ethyl-10,11-epoxyoctadecanedioate,
dibutyl 3-butyl-3,4,5,6-diepoxycyclohexane-1,2-dicarboxylate,
dicyclohexyl 3,4,5,6-diepoxycyclohexane-1,2-dicarboxylate,
dibenzyl 1,2,4,5-diepoxycyclohexane-1,2-dicarboxylate, and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexane and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Other epoxy-containing organic materials to be employed in the present invention are the members of the group consisting of the organic compounds possessing a plurality of epoxyalkoxy radicals, e.g., two to four, joined to an organic radical which contains from one to two aromatic rings, organic compounds possessing a plurality of epoxyhydroxyalkoxy radicals, e.g., two to four, joined to an organic radical containing from one to two aromatic rings, the polyepoxy-containing polymeric reaction product of an aromatic polyhydric phenol and epihalohydrin, the polyepoxy-containing polymeric reaction product of an aliphatic polyhydric alcohol and epichlorohydrin, the polyepoxy--containing polymeric reaction product of a polyhydric phenol and a polyepoxide compound, the polyepoxy-containing polymeric reaction product of an aliphatic polyhydric alcohol and a polyepoxide compound, the polymers of the epoxy-containing monomers possessing at least one polymerizable ethylenic linkage prepared in the absence of alkaline or acidic catalysts, and copolymers of the foregoing epoxy-containing monomers and a monomer containing at least one $CH_2=C=$ group prepared in the absence of alkaline or acidic catalysts. The expression "epoxyalkoxy" radical refers to an alkoxy radical substituted with an epoxy group. The expression "epoxyhydroxyalkoxy radical" refers to an alkoxy radical substituted with a hydroxyl and epoxy group.

Coming under special consideration are the monomeric and polymeric-type glycidyl polyethers of dihydric phenols obtained by reacting epichlorohydrin with a dihydrin phenol in an alkaline medium. The monomeric products of this type may be represented by the general formula

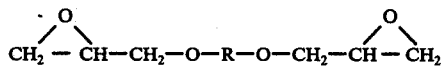

wherein R represents a divalent hydrocarbon radical of the dihydric phenol. The polymeric products will generally not be a single simple molecule but will be a complex mixture of glycidyl polyethers of the general formula

wherein R is a divalent hydrocarbon radical of the dihydric phenol and n is an integer of the series 0, 1, 2, 3, etc. While for any single molecule of the polyether n is an integer, the fact that the obtained polyether is a mixture of compounds causes the determined value for n to be an average which is not necessarily zero or a whole number. The polyethers may in some cases contain a very small amount of material with one or both of the terminal glycidyl radicals in hydrated form.

The afore-described preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess, to the epichlorohydrin. The reaction is preferably accomplished at a temperature within the range of from 50° to 150° C. The heating is continued for several hours to effect the reaction and the product is then washed free of salt and base.

Another suitable group of polyglycidyl ethers for use in this invention are the polyglycidyl ethers of alpha, alpha-omega, omega-tetrakis (hydroxyaryl) alkanes. This group of compounds is described and illustrated in U.S. Pat. No. 2,806,016 to Schwarzer. The polyglycidyl ether prepared as in Example I of said patent has a melting point of about 85° C. and contains 0.452 epoxy equivalent per 100 grams.

Particularly useful in the present invention are the low molecular weight, liquid glycidyl polyethers of dihydric phenols obtained by reacting epichlorohydrin with a dihydric phenol in an alkaline medium. A specific example of a liquid polyepoxide which is useful is "Epon 828," a trademarked product of Shell Chemical Company, which is a pourable (10,000–16,000 centipoises at 25° C.), liquid epoxy resin having a melting point of 8°–12° C., an epoxide equivalent weight of 180–195 and is formed by reaction of 4,4'-dihydroxydiphenol propane or 2,2-bis(4-hydroxyphenyl) propane and epichlorohydrin in a molar ratio, respectively, of about 1:2. Another example is "Epon 830" (Shell Chemical Company), which is a pourable (17,000–22,500 centipoises at 25° C.), liquid epoxy resin having a melting point of 12°–16° C., and an epoxide equivalent weight of 190–198.

Preferred members of the above-described group of polyepoxides are the glycidyl polyesters of the dihydric phenols, and especially 2,2-bis(4-hydroxyphenyl) propane (i.e., bisphenol A), having an epoxy equivalency between 1.0 and 2.0 and a molecular weight between 900 and 2,900. Particularly preferred are those having a Durran's mercury method softening point of at least about 100° C.

Another group of epoxy resins includes polyepoxidized phenol or creosol novolac which are made following procedures well known in the phenol-formaldehyde resin art, by a condensation reaction involving formaldehyde and a cresol (or phenol) in excess amounts, using an acid catalyst, and yielding liquid or low-fusing thermoplastic products. Such products are available in epoxidized forms, having average molecular weights in the vicinity of 1,000 and epoxy equivalent weights in the range of 160–210 frequently about 170–180. Examples of epoxy novolacs which are useful are those designated as "D.E.N." by the Dow Chemical Company, such resins having a structural formula of

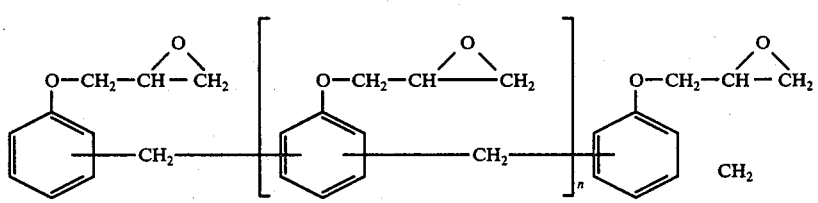

Specifically, "D.E.N. 431" is a liquid epoxy novolac, designated in formula (1) above where n has an average value of 0.2, having an epoxide equivalent weight of 172–179 and a viscosity of 1100–1700 centipoises at 52° C. "D.E.N. 438" is a second epoxy novolac which is semi-solid, designated in formula (1) above, where n has an average value of 1.6, having an epoxide equivalent weight of 176–181 and a viscosity of 20,000–50,000 centipoises at 52° C. "D.E.N. 439" is a third epoxy novolac which is semi-solid, designated in formula (1) above, where n has an average value of 1.8, having an epoxide equivalent weight of 191–210 and a softening point of 48°–58° C.

It is to be noted hereat that where solid polyepoxy resins are contemplated, they may be employed by a dissolution in a suitable liquid polyepoxy resin, such as "Epon 828" or "D.E.N. 431."

Other reactive resins include polyethers, polyols (including polyacrylics and alkyds), polyacetals and polyamides.

Combined with the reactive resin is a suitable methylated urea-formaldehyde resin. A suitable methylated urea-formaldehyde resin is described in U.S. Pat. No. 3,803,095, incorporated hereinto by reference, namely a substantially anhydrous water-soluble thermosetting stable methylated urea-formaldehyde resin wherein the weight of the methoxyl substituents therein is between 28 and 40% of the weight of the resin and the molar ratio of the reacted formaldehyde in the resin to the methoxyl substituents is such that in the absence of organic solvent the resin at 25° C. is soluble to the extent of at least 50% by weight in water and dissolves at least 50% of its weight of toluene, the polymeric form of the resin being not substantially in excess of tetrameric, the molar ratio of reacted urea to reacted formaldehyde in the resin and the molar ratio of reacted formaldehyde to reacted methanol therein being within the ranges:

|        | Molar ratio |          |          |          |           |
|--------|-------------|----------|----------|----------|-----------|
| Ranges | Urea        | :CH$_2$O | :CH$_3$OH | CH$_2$O | :CH$_3$OH |
| Lower  | 1           | 2.2      | 1.3      | 1        | 1.10      |
| Upper  | 1           | 2.8      | 2.0      | 1        | 2.15      | the resin consisting essentially of

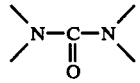

units, —CH$_2$ bridges between the units, and —H, —CH$_2$OH, and —CH$_2$OCH$_3$ substituents.

The substantially anhydrous water-soluble thermosetting stable methylated urea-formaldehyde resin is prepared by refluxing at an alkaline pH a starting mixture comprising 1 mol of urea, 2 to 4 mols of formaldehyde, and 2 to 6 mols of methanol at a pH of 7.5–11.5 until sufficient of the formaldehyde has reacted with the urea to form a water-soluble methylol urea, that is, until the mixture is clear and homogeneous. Upon forming a clear and homogeneous mixture, the mixture is then refluxed at an acid pH of 4.5–5.5 in the substantial absence of water until the rate at which the methanol reacts with the methylolurea has become negligibly slow. The pH of the mixture is adjusted from the acid reflux to 2 to 3 and the mixture is maintained (cooled) at 20° to 40° C. until the mixture is soluble in butanol at 25° C. The pH of the mixture is then adjusted to 7–10 and substantially all of the water present is distilled off whereby a methylated urea-formaldehyde resin is formed which is soluble at 25° C. to the extent of at least 50% weight in water which dissolves at least 50% of its weight of toluene, and which has a content of methoxyl substituents between 28 and 40% of the weight of the resin, the polymeric form of the resin being not substantially in excess of tetrameric.

The resulting resinous syrup is then heated under vacuum to strip off any volatiles present (water, formaldehyde, methanol, etc.). The residue is a water-clear substantially anhydrous thermosetting methylated urea-formaldehyde resin consisting essentially of reacted urea, formaldehyde and methanol. The resin is prepared in low polymeric form as it loses water solubility and gains viscosity with increasing molecular weight. The resin substantially in the dimeric-tetrameric range is preferred, as in this range the resin shows little or no tendency to crystallize on storage, possesses excellent solubility properties, and possesses a desirably low viscosity.

The structural formula of the resin has not been determined. However, the resin consists essentially of

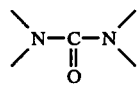

units, —CH$_2$—bridges and —H, —CH$_2$OH, and

—CH$_2$OCH$_3$ substituents. A minor proportion of the CH$_3$ substituents may be the radicals of lower water-soluble alcohols (ethyl, n-propyl, n-butyl, etc.) and even substantially water-insoluble alcohols (e.g., 1-hexyl) without altering the essential character of the resin. The C$_2$-C$_6$ alkanols provide resins of good oil solubility and are therefore preferred.

The resin possesses very satisfactory all-around water and oil-solubility, coupled with desirably low viscosity, when it is composed of inter-reacted urea, formaldehyde and methanol in the following molar proportions and when the molar ratio of the combined formaldehyde to the methoxyl substituents is as shown below.

The preferred range (which appears to provide best solubility characteristics) is shown in brackets.

| Range | Moles | | | Molar ratio CH$_2$O: CH$_3$O— | |
|---|---|---|---|---|---|
| | Urea | CH$_2$O | CH$_3$OH | Broad | Preferred |
| Lower | 1 | 2.2 | 1.3 | 1.10 | 1.70 |
| Upper | 1 | 2.8 | 2.0 | 2.15 | 1.40 |
| [Preferred | 1 | 2.4 | 1.5 | | 1.60] |

In the table, the broad values in the "molar ratio" column were determined by dividing the lower CH$_2$O value with the upper CH$_3$OH value, and by dividing the upper CH$_2$O value with the lower CH$_3$OH value. The preferred values were obtained by dividing the lower CH$_2$O value with the lower CH$_3$OH value, etc. The last horizontal line of the table indicates the values between upper and lower ranges which appear to give overall best results.

The values shown in the table above and the requirement that the resin contain 28 to 40% methoxyl substituents by weight represent mutually dependent variables. In each instance, the proportion of methoxyl substituents should be a value in the 28-40% range which provides good toluene solubility without causing water insolubility, and the proportion of hydroxymethyl substituents should be such that the resin possesses good water solubility without causing toluene insolubility.

The replacement of a small part of the methoxy substituents with butoxy, propoxy and higher substituents in the C$_2$-C$_6$ range improves the solubility of the resin in toluene and in xylene without significantly decreasing the solubility of the resin in water. In general 0.5 mol of one or more C$_2$-C$_6$-alkoxy substituent per urea residue is advantageous. When it is desired to incorporate a higher alcohol into the resin, best results are obtained when the desired higher alcohol (i.e., propanol, butanol, etc.) is added to the reaction mixture after the water and unreacted methanol (or ethanol) has been distilled off at the conclusion of the first acid reaction and before the start of the second acid reaction, so that an ether exchange occurs during the second acid reaction. The higher alcohol may be conveniently added in excess to the reaction mixture and the excess distilled off once the desired amount of ether exchange has been accomplished.

The reactive resin is combined or mixed with the methylated urea-formaldehyde resin to form a liquid, i.e., either a true liquid or an anomalous liquid (e.g., a paste) resin mixture. If any of the components of the resultant mixture are in the solid form, either prior to mixing or subsequent to mixing, a suitable liquid reactive resin is employed or added to form the liquid mixture. It is to be stressed that a solvent is not employed to accomplish the foregoing, but rather a compatible liquid resin such as for example a liquid diglycidyl ether of bisphenol A, such as "Epon 828," or a liquid epoxidized novolac, such as "D.E.N. 431."

The reactive resin is present in the resultant liquid mixture in an amount ranging from 50 to 90 weight percent of the total resin combination. If less than 50 weight percent or more than 90 weight percent of the reactive resin is present, the ink which is destined to be formed and applied to a surface will be "wet" for an inordinate period of time, e.g., several days, and thus will smear, run, etc., and will not be useful for its intended printing purpose. The wetness of the ink in such a situation is due to the failure of the resin components to chemically combine to a sufficient degree upon application of the resultant ink to the surface and a destined, subsequent heat treatment of the applied ink. Typically, the reactive resin is present in an amount ranging from 60 to 80 weight percent of the total resin mixture.

The resultant resin mixture is then combined or mixed with a suitable pigment to form an ink having the desired color and opacity. The pigment may be either an organic or an inorganic pigment and may comprise any conventional pigment known in the art. The various pigments and their properties are well known in the art and will not be elaborated herein. In this regard, reference is made to *Printing and Litho Inks,* Herbert Jay Wolfe, MacNair-Dorland Company, Sixth Edition, 1967, wherein some typical pigments are described.

The pigment is present in the resultant ink in an amount ranging from 1 to 35 weight percent of the resultant ink. Typically, the pigment is present in the resultant ink in an amount ranging from about 5 to about 20 weight percent of the resultant ink.

It is of course to be understood that other conventional additive agents may be added to the resultant ink such as thixotropic agents, tackifying agents, flow control agents, etc., to control rheological properties, printing tack, printability, respectively, etc.

The ink is applied, using any conventional printing technique, e.g., letterset, lithographic, letterpress, gravure set, screen printing, etc., to any desired surface and is then heat treated to attain a desired degree of heat cure. Typically, the applied ink is heated under conditions of time and temperature, e.g., typically ranging from 15 to 60 minutes at 150° to 200° C. for an "Epon 828" or "Epon 830" combined with the methylated urea-formaldehyde resin, whereby a fully cured ink results. By a full cure one means that the active groups, e.g., oxirane or epoxy, hydroxyl, etc., originally present, have been essentially consumed during the curing reaction and the degree of crosslinking obtained provides optimum physical properties for the desired application. Typically, for the inks described above, a full cure is characterized by (a) a flexibility test in which no cracking of the heated ink surfaces is visually apparent; (b) a scrape adhesion test in which no ink material is removed upon scraping with a weighted stylus; (c) alkali resistance in which the ink is not degraded by exposure to a concentrated alkali solution for an extended period of time such as 24 hours; and (d) solvent resistance in which ink material is not removed by rubbing the ink surfaces with a solvent saturated, weighted stylus.

It is of course to be understood that the time and temperture curing parameters are interdependent and that variations in temperature will require variations in time whereby optimum results will be attained. In this regard, the various curing parameters and their interdependency are well known in the art, and their interreaction between one another is also well known or can be easily ascertained experimentally by one skilled in the art in the light of the disclosure contained herein.

Surprisingly and unexpectedly, the resultant ink can be applied or printed to many surfaces having widely divergent physical characteristics and still maintain the desired printing standards such as high resolution, adherence, etc. The ink can be printed on (1) a surface comprising an organic polymer, e.g., epoxy, polyester (polyethylene terephthalate), polyvinyl triacetate, etc.; (2) a metal surface (foil of 1 mil thickness, as well as sheet material), e.g., aluminum, copper, steel, etc.; and (3) a paper surface including coated and uncoated paper surfaces such as bond, ledger, vellum, etc. Thus, the ink can be used for metal decorating, printing on plastics as well as conventional printing on paper or cellulosic surfaces.

The ink can be applied to divergent surfaces, e.g., epoxy, copper, paper, etc., using any conventional printing technique, e.g., letterpress, to obtain a printed pattern having high resolution, e.g., typically in printed wiring board manufacture of the order of at least 6.3 lines/mm.

It is also to be understood that although the ink is described above in terms of being solvent free, a suitable conventional solvent or carrier may be incorporated in the ink if desired. Suitable solvents or carriers are well known in the art and are readily ascertainable by one skilled therein and thus will not be elaborated upon herein. In this regard, reference is again made to H. J. Wolfe, *Printing and Litho Inks*.

Referring to FIG. 1, there is shown a portion of a suitable substrate 70. For the porduction of electrical circuit patterns, suitable substrates are those which are generally nonconductive. In general, all dielectric materials are suitable substrates. A surface 71 of substrate 70 is treated to form a sensitized or catalytic layer or coat 72 capable of participating in the catalytic reduction of an electroless metal from a suitable electroless metal deposition solution. Such a sensitized layer comprises a suitable activiating metal, e.g., Pt, Pd, Ag, Au, etc., which is capable of functioning as a catalytic species in an electroless metal deposition. Surface 71 is sensitized by first treating surface 71 with a solution comprising a reducing agent, e.g., $Sn^{+2}$ ions, capable of reducing an activating metal ion, e.g., $Pd^{+2}$, $Pt^{+2}$, to an activating metal, e.g., $Pd^o$, $Pt^o$. The treating solution may be a true solution or a colloidal solution (sol). U.S. Pat. No. 3,657,003, incorporated hereinto by reference, reveals suitable sols containing colloidal species, e.g., colloidal tin species, capable of reducing a precious metal, e.g., palladium, platinum, silver, gold, etc. from a salt solution thereof. Other reducing agents, both colloidal and non-colloidal, are well known to those skilled in the art and will not be elaborated herein.

The reducing agent treated surface 71 is then activated, i.e., is exposed in a conventional manner, e.g., by immersion, to an activating solution, e.g., an aqueous $PdCl_2$ solution or an activating sol, such as those revealed in U.S. Pat. No. 3,657,003, containing an activating metal species, e.g., $Pd^{+2}$, wherein the activating metal species, e.g., $Pd^{+2}$, is reduced to the metal, e.g., $Pd^o$, and deposited on surface 71 to form sensitized layer 72.

Alternatively, suitable colloidal sols comprising activating species, capable of participating in an electroless metal deposition, by initially being capable of functioning as a reduction catalyst for the electroless metal deposition, existing as so-called "one-step activators" may be employed. Surface 71 may be treated with such a colloidal one-step activator whereby a metallic activating metal, e.g., palladium, is deposited thereon to form layer 72. One such typical colloidal one-step activator revealed in U.S. Pat. No. 3,011,920, contains stannous chloride, palladium chloride and aqueous hydrochloric acid. Colloidal palladium is formed by the reduction of the palladium ions by the stannous ions of the stannous chloride.

Another suitable colloidal one-step activator, revealed in U.S. Pat. No. 3,523,518, comprises acid palladium metal-stannous chloride sols.

The printing ink, described above, comprising the resin mixture of a reactive resin combined with the methylated urea-formaldehyde resin and the pigment is applied, as by printing, to sensitized surface 71 to form a printed pattern 73, which is heat treated to attain a full cure thereof. It is to be noted that for purposes of the selective metallization destined to be carried out, only the resin mixture comprising the reactive resin combined with the methylated urea-formaldehyde resin need by employed to form printed pattern 73 to delineate exposed portions 74 of layer 72 capable of participating in an electroless metal deposition catalysis while pattern 73 is initially incapable of such participation.

Printed patterned surface 71 is then treated with a selective desensitizing agent whereby exposed portions 74 of sensitized layer 72 are desensitized and where surprisingly printed pattern 73 is now sensitized whereby pattern 73 can participate in an electroless metal deposition catalysis.

A suitable desensitizing agent comprises a basic solution, aqueous or non-aqueous, of a mixture comprising a phosphate, $Na_3PO_4$, $K_3PO_4$, etc., combined with any base, which is compatible with substrate 70, and ink pattern 73. The base comprises any compatible compound which yields hydroxyl ions in aqueous solutions, or reacts with an acid to form water and a salt or any substance whose molecules can take up protons. Suitable desensitizing bases include organic bases, e.g., amines, and inorganic bases, e.g., NaOH. Preferred desensitizing agents include alkali and alkaline earth bases such as KOH, NaOH, $Na_2CO_3$, $Ca(OH)_2$, $Mg(OH)_2$, etc., and $NH_4OH$. The reason for the selective sensitizing by the basic desensitizer comprising the phosphate species and base compound is not as yet known or explainable.

The concentrations of the phsophate and the base are not critical and amounts of each are provided whereby selective desensitization and concurrent sensitization occur. Typically, the basic phosphate species is present in a resultant aqueous desensitizing solution in amounts occurring from about 1 to about 10 weight percent of the phosphate species, e.g., $Na_3PO_4$, whereby the base compound is present in an amount ranging from about 10 to about 40 weight percent of the solution.

Sensitized surface 71 is treated with the desensitizing agent for a period of time, e.g., 10 minutes, and at a suitable temperature, e.g., 50° C., whereby exposed portions 74 of sensitized layer 72 are desensitized and pattern 73 is sensitized. The time of exposure and the temperature of the desensitizing solution or temperature of exposure are parameters which are interrelated. This interrelationship is easily ascertained by one skilled in the art in view of the disclosure contained herein.

The thus desensitizing agent treated surface 71 may then be water rinsed, or, alternatively, may first be neutralized with an acid solution and then rinsed and is then treated with or immersed in a conventional electroless metal deposition solution wherin an electroless metal ion, e.g., $Cu^{+2}$, $Ni^{+2}$, is reduced to the metal, e.g., $Cu^o$, $Ni^o$, and deposited on now-sensitized pattern 73 of surface 71 of substrate 70 to form an electroless metal deposit 76, as shown in FIG. 2. Electroless metal deposit 76 may be built up to a desired thickness by prolonged immersion in the electroless metal deposition solution or, alternatively, may be further built up by being electroplated in a standard electroplating bath.

It is to be noted hereat that the various typical conventional activators, activating solutions, reducing agents for the activating species, electroless and electroplating solutions, sensitizing and plating conditions and procedures are well known in the art and will not be elaborated herein. Reference in this regard is made to *Metallic Coating of Plastics*, William Goldie, Electrochemical Publications, 1968.

EXAMMPLE I

A solventless, odorless printing ink was prepared in the following manner. Eighty grams of a liquid diglycidyl ether of bisphenol A having an epoxide equivalent weight of 180-195, a viscosity of 10,000-16,000 centipoises at 25° C., a melting point of 8°-12° C. (commercially obtained from Shell Chemical Company and designated as "Epon 828") was combined with 20 grams of a substantially anhydrous water-soluble thermosetting stable methylated urea-formaldehyde resin wherein the weight of the methoxyl substituents therein is between 28 and 40% of the weight of the resin and the molar ratio of the reacted formaldehyde in the resin to the methoxyl substituents is such that in the absence of organic solvent the resin at 25° C. is soluble to the extent of at least 50% by weight in water and dissolves at least 50% of its weight of toluene, the polymeric form of the resin being not substantially in excess of tetrameric, the molar ratio of reacted urea to reacted formaldehyde in the resin and the molar ratio of reacted formaldehyde to reacted methanol therein being within the ranges:

| Ranges | Urea | :CH$_2$O | Molar ratio :CH$_3$OH | CH$_2$O | :CH$_3$OH |
|---|---|---|---|---|---|
| Lower | 1 | 2.2 | 1.3 | 1 | 1.10 |
| Upper | 1 | 2.8 | 2.0 | 1 | 2.15 | and the resin consisting essentially of

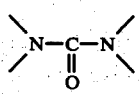

units,

—CH$_2$ bridges between the units, and —H, —CH$_2$OH and —CH$_2$OCH$_3$ substituents (commercially obtained from American Cyanamid Company and designated as "Beetle 65") to form a liquid resin mixture. Forty grams of the resultant resin mixture were combined with 10 grams of carbon black, having a particle size of 54 microns and a surface area of 33m$^2$/gm. (commercially obtained) to form a mixture. The resultant mixture was passed through a three-roll ink mill to evenly disperse the pigment throughout the medium to form the resultant ink.

The ink was applied by a letterset printing technique to an aluminum surface which was subsequently heated at 220° C. for 30 minutes to attain a full cure of the ink as evidenced by (1) a flexibility test in which the inked surface was bent or flexed 180° whereby no cracking in the applied and cured ink was observable to the naked eye; (2) a scrape adhesion test in which no ink was removed from the inked surface upon being scraped with a commercially obtained balance beam scrape adhesion tester having a 10 K gm. weight affixed to the scraping stylus thereof; (3) a solvent resistance test in which no ink was removed from the inked surface upon being double rubbed 100 times with a methylene chloride saturated pad affixed to the scraping stylus of the scrape adhesion tester of (2) above, which had a 500 grams weight affixed to the stylus; and (4) an akali resistance test in which the inked pattern exhibited no degradation after being immersed in an aqueous 1.0 weight percent NaOH solution (pH = 12-13) at 60°-70° C. for 24 hours.

The inked pattern had a pattern resolution of 6.3 lines/mm.

EXAMPLE II

The procedure of Example I was repeated except that the resin mixture comprised 60 grams of the diglycidyl ether of bisphenol A, 20 grams of a second diglycidyl ether of bisphenol A having an epoxide equivalent weight of 400-420, a viscosity of 450-600 centipoises at 25° C. (commercially obtained from Shell Chemical Company and designated as "Epon 871"), and 20 grams of the methylated urea-formaldehyde resin. Sixty grams of the resultant resin mixture were combined with 10 grams of the carbon black.

The resultant ink was fully cured on the aluminum surface after 30 minutes at 220° C. The inked pattern had a resolution of 6.3 lines/mm.

EXAMPLE III

The procedure of Example II was repeated except that the resin mixture comprised 300 grams of the first diglycidyl ether, 100 grams of the second diglycidyl ether and 100 grams of the methylated urea-formaldehyde resin. The resultant resin mixture was then combined with 125 grams of the carbon black.

EXAMPLE IV

The procedure of Example III was repeated except that the carbon black employed had a particle size of 24 microns and a surface area of 138m$^2$/gm.

EXAMPLE V

The procedure of Example III was repeated except that the resultant ink was printed on a cured epoxy surface and fully cured at 200° C. for 60 minutes. The inked pattern had a resolution of 6.3 lines/mm.

EXAMPLE VI

The procedure of Example IV was repeated except that the resultant ink was printed on a cured epoxy surface and fully cured at 200° C. for 60 minutes. The inked pattern had a resolution of 6.3 lines/mm.

EXAMPLE VII

A solventless, odorless printing ink was prepared in the following manner. Five grams of a solid diglycidyl ether of bisphenol A, having an epoxide eqiuivalent weight of 200-2500, a Gardner-Holdt viscosity of Y-Z (at 40% non-volatiles in Dowanol DB at 25° C.), and a Durran's softening point of 125°-135° C. (commercially obtained from Shell Chemical Company and designated as "Epon 1007"), was dissolved in 95 grams of the diglycidyl ether of bisphenol A of Example I. Thirty grams of the resultant diglycidyl ether mixture were combined with 10 grams of the carbon black of Example I and 20 grams of the methylated urea-formaldehyde of Example I to form the ink. The ink was letterset printed on a cured epoxy coated surface with a pattern resolution of 6.3 lines/mm.

EXAMPLE VIII

A solventless, odorless printing ink was prepared in the following manner. A resin mixture comprising 60 grams of the first diglycidyl ether of Example II, 20 grams of the second diglycidyl ether of Example II and 20 grams of the methylated urea-formaldehyde of Example II, was prepared. To the resin mixture was added 25 grams of a commercially obtained black inorganic pigment comprising 99 weight percent of iron oxides. The resultant ink was printed on a surface of a metal core substrate having a cured epoxy surface coat. The inked surface was then heated at 200° C. for 60 minutes to obtain a full cure of the ink. The inked pattern had a resolution of 6.3 lines/mm.

EXAMPLE IX

The procedure of Example VIII was repeated except that 25 grams of a tan inorganic pigment were used, comprising 99 weight percent of a ferrite.

EXAMPLE X

The procedure of Example VIII was repeated except that 25 grams of a yellow inorganic pigment were used, comprising 99 weight percent of ferric oxide hydrate.

EXAMPLE XI

The procedure of Example VIII was repeated except that 25 grams of a red inorganic pigment were used, comprising 99 weight percent ferric oxide.

EXAMPLE XII

The procedure of Example VIII was repeated except that 25 grams of a white inorganic pigment, comprising titanium dioxide, were used.

EXAMPLE XIII

A solventless, odorless printing ink was prepared in the following manner. The resin mixture of Example VIII was used. To the resin mixture were added 25 grams of blue inogranic pigment, commercially obtained, comprising oxides of cobalt and aluminum. The ink was letterset printed on a cured epoxy coated surface and cured at 175° C. for 30 minutes. A pattern resolution of 6.3 lines/mm. was obtained.

EXAMPLE XIV

The procedure of Example XIII was repeated except that 25 grams of a green inorganic pigment, commercially obtained, comprising oxides of cobalt, aluminum and chromium, were employed.

EXAMPLE XV

The procedure of Example XIII was repeated except that 25 grams of a red inorganic pigment, commercially obtained, comprising $Fe_2O_3$, were employed.

EXAMPLE XVI

The procedure of Example XIII was repeated except that 25 grams of a green inorganic pigment, commercially obtained, comprising oxides of cobalt, titanium, zinc, nickel and aluminum, were employed.

EXAMPLE XVII

The procedure of Example XIII was repeated except that 25 grams of a brown inorganic pigment, commercially obtained, comprising 74 weight percent $Fe_2O_3$, and 19 weight percent silicates, were employed.

EXAMPLE XVIII

The procedure of Example XIII was repeated except that 25 grams of a black inorganic pigment, commercially obtained, comprising ferric oxide, were employed.

EXAMPLE XIX

The procedure of Example XIII was repeated except that 25 grams of a blue organic pigment, commercially obtained, comprising phthalocyanine blue, were employed.

EXAMPLE XX

The procedure of Example XIII was repeated except that 25 grams of a red inorganic pigment, commercially obtained, comprising a mixture of $CdS$, $HgS$, $BaSO_4$, were employed.

EXAMPLE XXI

A solventless, odorless printing ink was prepared in the following manner. Eighty grams of a diglycidyl ether of bisphenol A, having an epoxide equivalent weight of 190–198, and a viscosity of 17,000–22,500 centipoises at 25° C. (commercially obtained from Shell Chemical Company and designated as "Epon 830"), were mixed with 23 grams of the methylated urea-formaldehyde resin of Example I and a black inorganic pigment, commercially obtained, comprising ferric oxide. The ink was letterset printed on a cured epoxy coated surface and cured at 175° C. for 30 minutes. A pattern having a resolution of 6.3 lines/mm was obtained.

EXAMPLE XXII

The procedure of Example XXI was repeated except that the ink comprised 80 grams of the diglycidyl ether, 22 grams of the methylated urea-formaldehyde resin, 10 grams of the inorganic pigment and 1 gram of silicon dioxide.

EXAMPLE XXIII

The procedure of Example XXII was employed except that 2 grams of silicon dioxide were employed.

EXAMPLE XXIV

The procedure of Example XXII was employed except that 23 grams of the methylated urea-formaldehyde resin were used and 3 grams of the silicon dioxide were used.

EXAMPLE XXV

The procedure of Example XXII was employed except that 5 grams of the silicon dioxide were used.

EXAMPLE XXVI

The procedure of Example XXII was employed except that 15 grams of the silicon dioxide were used.

EXAMPLE XXVII

The procedure of Example XXII was employed except that the silicon dioxide was replaced with 5.8 grams of an organic derivative of a montmorillonite clay (commercially obtained from NL Industries and designated as "Bentone 27").

EXAMPLE XXVIII

The procedure of Example XXVII was repeated except that the ink comprised 225 grams of the diglycidyl ether, 55 grams of the methylated urea-formaldehyde resin, 50 grams of the black pigment ($Fe_2O_3$) and 30 grams of the organic derivative of the montmorillonite clay.

EXAMPLE XXIX

The procedure of Example XXVIII was repeated except that the ink comprised 200 grams of the diglycidyl ether, 50 grams of the methylated urea-formaldehyde resin, 50 grams of the black inorganic pigment ($Fe_2O_3$) and 30 grams of the clay.

EXAMPLE XXX

A plurality of solventless, odorless printing inks was prepared in the following manner. Forty grams of the diglycidyl ether of bisphenol A of Example XXI were combined with 10 grams of the methylated urea-formaldehyde resin of Example I and 7.5 grams of a pigment selected from the following group of pigments to form the plurality of inks:

a. carbazole dioxazine violet;
b. chlorinated phthalocyanine;
c. perylene red;
d. phthalocyanine blue (green);
e. $Cr_2O_3.2H_2O$ (green);
f. $Cr_2O_3$;
g. $TiO_2$;
h. ferric oxide (red);
i. 76 weight percent FeO, 19 weight percent silicates (brown);
j. $Fe_2O_3.2H_2O$ (yellow);
k. iron oxide (black);
l. 80 weight percent $TiO_2$, 3.5 weight percent NiO, 13.5 weight percent $Sb_2O_3$;
m. 80 weight percent $TiO_2$, 3.8 weight percent NiO, 14.9 weight percent $Sb_2O_3$;
n. hansa monoazo yellow; and
o. perinone orange.

The plurality of inks were letterset printed on the following surfaces:

1. an epoxy surface; and
2. a copper surface and cured at 175° C. for 30 minutes. As inked pattern having a resolution of 6.3 lines/mm. was obtained.

EXAMPLE XXXI

A solventless, odorless printing ink was prepared in the following manner. One hundred grams of an epoxy novolac (commercially obtained from The Dow Chemical Company and designated as "D.E.N. 431"), having an epoxide equivalent weight of 172–179 and a viscosity of 1100–1700 at 52° C. were combined with the methylated urea-formaldehyde resin of Example I and 20 grams of carbon black. The resultant ink was letterpress printed on a surface comprising a cured epoxy and cured thereon at a temperature of 175° C. for 30 minutes. A printed pattern having a resolution of 6.3 lines/mm. was obtained.

EXAMPLE XXXII

A. For comparison purposes, an epoxy coated, steel-core substrate was selected. An epoxy coated surface of the substrate was sensitized with a commercially obtained one-step sensitizer comprising colloidal palladium metal. The printing ink of Example XIX was applied by a letterset printing technique to the resultant sensitized surface to form an ink pattern. The ink patterned surface was then immersed in a commercially obtained electroless copper plating bath comprising cupric sulfate, formaldehyde, KOH, and tetrasodium salt of ethylenediaminetetraacetic acid, for ten minutes wherein an electroless copper deposit was obtained only on the exposed (non-inked) surface areas.

B. The procedure of Examine XXXII-A was repeated except that prior to the electroless copper plating treatment, the ink patterned surface was treated with a commercially obtained cleaner or desensitizer comprising an aqueous solution comprising trisodium phosphate, NaOH, $Na_2CO_3$ and a surfactant for 15 minutes at 50° C. The substrate was water rinsed for 10 minutes at 25° C., neutralized in a 5 weight percent aqueous $H_2SO_4$ bath for one minute at 25° C and water rinsed for 5 minutes at 25° C. A 1.4 mil thick electroless copper deposit was obtained only on the linked pattern after twenty four hours.

C. For comparison purposes only, the proceure of Example XXXII-B was repeated except that the ink patterned surface was treated with the cleaner for 3 minutes. A selective metallization on the inked pattern was not obtained, but rather a 10 μ inch thick blanket electroless copper deposit over both the inked and non-inked surface areas was obtained after ten minutes.

D. For comparison purposes, the procedure of Example XXXII-B was repeated except that the ink patterned surface was treated with an aqueous solution comprising 30 weight percent NaOH. The inked pattern was treated with the NaOH solution for 30 minutes at 50° C., water rinsed for 5 minutes at 25° C., neutralized by immersion in a 5 weight percent aqueous $H_2SO_4$ solution for 1 minute at 25° C., water rinsed for 5 minutes at 25° C. and immersed in the electroless copper deposition solution for 2 minutes. A blanket 2 μ inch thick electroless copper deposit was obtained on both the inked and non-inked surface areas after 2 minutes.

E. For comparison purposes, the procedure of Example XXXII-D was repeated except that a ten weight patterned surface for 12 hours at 25° C. The thus treated substrate was water rinsed for 2 minutes at 25° C., neutralized in a 5 weight percent aqueous $H_2SO_4$ solution for 1 minute at 25° C. and water rinsed for 2 minutes at 25° C. A blanket 2 μ inch thick electroless copper deposit was obtained on both the inked and non-inked surface areas after three minutes.

F. For comparison purposes, the procedure of Example XXXII-B was repeated except that the ink patterned surface was treated with an aqueous solution comprising 5 weight percent $Na_3PO_4$. The ink patterned surface was treated with air purged $Na_3PO_4$ solution for 15 minutes at 50° C. followed by water rinsing for 2 minutes at 25° C., neutralized in 5 weight percent aqueous $H_2SO_4$ for one minute and water rinsed for 2 minutes at 25° C. A blanket 10 μ inch thick electroless copper deposit was obtained on both the inked and non-inked surface areas after 10 minutes.

G. The procedure of Example XXXII-B was repeated except that the desensitizer comprised an aqueous solution comprising 30 weight percent NaOH and 5 weight percent $Na_3PO_4.12H_2O$. The ink patterned surface was treated with this solution for 15 minutes at 50° C., water rinsed for 2 minutes, neutralized by immersion in 5 weight percent aqueous $H_2SO_4$ solution for one minute and then water rinsed for two minutes. A 10 µ inch thick electroless copper deposit was obtained only on the inked pattern after one hour.

It is to be understood that the above-described embodiments are simply illustrative of the principles of the invention. Various other modifications and changes may be made by those skilled in the art which will embody the principles of the invention and fall within the spirit and scope thereof.

What is claimed is:
1. A printing ink which comprises:
   a. a resin mixture consisting essentially of an epoxy resin, combined with a second resin comprising a substantially anhydrous water-soluble thermosetting stable methylated urea-formaldehyde resin wherein the weight of the methoxyl substituents therein is between 28 and 40% of the weight of the resin and the molar ratio of the reacted formaldehyde in said resin to said methoxyl substituents is such that in the absence of organic solvent the resin at 25° C. is soluble to the extent of at least 50% by weight in water and dissolves at least 50% of its weight of toluene, the polymeric form of said resin being not substantially in excess of tetrameric, the molar ratio of reacted urea to reacted formaldehyde in said resin and the molar ratio of reacted formaldehyde to reacted methanol therein being within the ranges:

| Ranges | Molar ratio | | | | |
|---|---|---|---|---|---|
| | Urea | :$CH_2O$ | :$CH_3OH$ | $CH_2O$ | :$CH_3OH$ |
| Lower | 1 | 2.2 | 1.3 | 1 | 1.10 |
| Upper | 1 | 2.8 | 2.0 | 1 | 2.15 | and said resin consisting essentially of

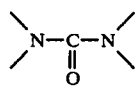

units, —$CH_2$ bridges between said units, and —H, —$CH_2OH$ and —$CH_2OCH_3$ substituents; and
   b. a pigment.

2. The printing ink as defined in claim 1 wherein in said second resin the molar content of reacted urea, formaldehyde and methanol and the molar ratio of reacted formaldehyde to methanol in the resin is within the range:

| Urea | mol 1 |
|---|---|
| $CH_2O$ | mols 2.4 |
| $CH_3OH$ | mols 1.5 |
| $CH_2O:CH_3OH$ | molar ratio 1.60. |

3. The printing ink as defined in claim 1 wherein said second resin is substantially in the dimerictetrameric range.

4. The printing ink as defined in claim 1 wherein said second resin contains up to about 0.5 mol of $C_2$-$C_6$ alkoxy substituents per urea residue therein.

5. The printing ink as defined in claim 1 wherein the alkoxy substituents of said second resin comprise n-butoxy substituents.

6. The printing ink as defined in claim 1 wherein said epoxy resin is selected from the group consisting of a glycidyl polyether of a dihydric phenol and an epoxy novolac.

7. The printing ink as defined in claim 1 wherein:
said epoxy resin is present in said resin mixture in an amount ranging from about 50 to about 90 weight percent, and
said pigment is present in the ink in an amount ranging from about 1 to about 35 weight percent of the ink.

8. A method of printing on a surface which comprises:
   a. applying on the surface an ink comprising (a) a resin mixture consisting essentially of an epoxy resin combined with a second resin comprising a substantially anhydrous water-soluble thermosetting stable methylated urea-formaldehyde resin wherein the weight of the methoxyl subtituents therein is between 28 and 40% of the weight of the resin and the molar ratio of the reacted formaldehyde in said resin to said methoxyl substituents is such that in the absence of organic solvent the resin at 25° C is soluble to the extent of at least 50% by weight in water and dissolves at least 50% of its weight of toluene, the polymeric form of said resin being not substantially in excess of tetrameric, the molar ratio of reacted urea to reacted formaldehyde in said resin and the molar ratio of reacted formaldehyde to reacted methanol therein being within the ranges:

| Ranges | Molar ratio | | | | |
|---|---|---|---|---|---|
| | Urea | :$CH_2O$ | :$CH_3OH$ | $CH_2O$ | :$CH_3OH$ |
| Lower | 1 | 2.2 | 1.3 | 1 | 1.10 |
| Upper | 1 | 2.8 | 2.0 | 1 | 2.15 | and said resin comprising essentially of

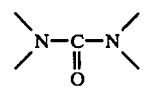

units, —$CH_2$ bridges between said units, and —H, —$CH_2OH$ and —$CH_2OCH_3$ substituents; and (b) a pigment, to form an inked surface.

9. The method as defined in claim 8 which further comprises heat treating said applied ink to cure said applied ink.

10. The method as defined in claim 8 wherein in said second resin the molar content of reacted urea, formaldehyde and methanol and the molar ratio of reacted formaldehyde to methanol in the resin is within the range:

| Urea | mol 1 |
|---|---|
| $CH_2O$ | mols 2.4 |
| $CH_3OH$ | mols 1.5 |
| $CH_2O:CH_3OH$ | molar ratio 1.60. |

11. The method as defined in claim 8 wherein said second resin is substantially in the dimerictetrameric range.

12. The method as defined in claim 8 wherein said second resin contains up to about 0.5 mol of $C_2-C_6$ alkoxy substituents per urea residue therein.

13. The method as defined in claim 8 wherein the alkoxy substituents of said second resin comprise n-butoxy substituents.

14. The method as defined in claim 8 wherein said epoxy resin is selected from the group consisting of a glycidyl polyether of a dihydric phenol and an epoxy novolac.

15. The method as defined in claim 8 wherein:
said epoxy resin is present in said resin mixture in an amount ranging from about 50 to about 90 weight percent, and
said pigment is present in said ink in an amount ranging from about 1 to about 35 weight percent of said ink.

16. A method of forming a solvent-free printing ink, which comprises:
a. forming a liquid resin mixture consisting essentially of an epoxy resin and a second resin, comprising a substantially anhydrous water-soluble thermosetting stable methylated urea-formaldehyde resin wherein the weight of the methoxyl substituents therein is between 28 and 40% of the weight of the resin and the molar ratio of the reacted formaldehyde in said resin to said methoxyl substituents is such that in the absence of organic solvent the resin at 25° C. is soluble to the extent of at least 50% by weight in water and dissolves at least 50% of its weight of toluene, the polymeric form of said resin being not substantially in excess of tetrameric, the molar ratio of reacted urea to reacted formaldehyde in said resin and the molar ratio of reacted formaldehyde to reacted methanol therein being within the ranges:

| Ranges | Urea | :CH$_2$O | :CH$_3$OH | CH$_2$O | :CH$_3$OH |
|---|---|---|---|---|---|
| Lower | 1 | 2.2 | 1.3 | 1 | 1.10 |
| Upper | 1 | 2.8 | 2.0 | 1 | 2.15 | and said resin consisting essentially of

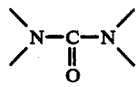

units, —CH$_2$ bridges between said units, and —H, —CH$_2$OH and —CH$_2$OCH$_3$ substituents; and
b. combining said liquid resin mixture with a pigment to form the ink.

17. The method as defined in claim 16 wherein in said second resin the molar content of reacted urea, formaldehyde and methanol and the molar ratio of reacted formaldehyde to methanol in the resin is within the range:

| Urea | mol 1 |
|---|---|
| CH$_2$O | mols 2.4 |
| CH$_3$OH | mols 1.5 |
| CH$_2$O:CH$_3$OH | molar ratio 1.60. |

18. The method as defined in claim 16 wherein said second resin is substantially in the dimerictetrameric range.

19. The method as defined in claim 16 wherin said secnd resin contains up to about 0.5 mol of $C_2-C_6$ alkoxy substituents per urea residue therein.

20. The method as defined in claim 16 wherein the alkoxy substituents of said second resin comprise n-butoxy substituents.

21. The method as defined in claim 16 wherein said epoxy resin is selected from the group consisting of a glycidyl polyether of a dihydric phenol and an epoxy novolac.

22. The method as defined in claim 16 wherein:
said epoxy resin is present in said resin mixture in an amount ranging from about 50 to about 90 weight percent, and
said pigment is present in the ink in an amount ranging from about 1 to about 35 weight percent of the ink.

23. A method of selectively depositing a metal on a surface, which comprises:
a. sensitizing the surface with a sensitizing species capable of catalyzing a metal deposition from an electroless metal deposition solution;
b. selectively coating said sensitized surface with at least a resin coat comprising a reactive resin combined with a second resin comprising a substantially anhydrous water-soluble thermosetting stable methylated urea-formaldehyde resin wherein the weight of the methoxyl substituents therein is between 28 and 40% of the weight of the resin and the molar ratio of the reacted formaldehyde in said resin to said methoxyl substituents is such that in the absence of organic solvent the resin at 25° C. is soluble to the extent of at least 50% by weight in water and dissolves at least 50% of its weight of toluene, the polymeric form of said resin being not substantially in excess of tetrameric, the molar ratio of reacted urea to reacted formaldehyde in said resin and the molar ratio of reacted formaldehyde to reacted methanol therein being within the ranges:

| Ranges | Urea | :CH$_2$O | :CH$_3$OH | CH$_2$O | :CH$_3$OH |
|---|---|---|---|---|---|
| Lower | 1 | 2.2 | 1.3 | 1 | 1.10 |
| Upper | 1 | 2.8 | 2.0 | 1 | 2.15 | and said resin consisting essentially of

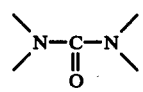

units, —CH$_2$ bridges between said units, and —H, —CH$_2$OH and —CH$_2$OCH$_3$ substituents to delineate an exposed sensitized surface pattern; and
c. treating said selectively coated surface with a desensitizing agent to desensitize said exposed pattern and sensitize said resin coat.

24. The method as defined in claim 23 which further comprises treating said desensitizing agent treated surface with an electroless metal deposition soluton to selectively deposit an electroless metal on said sensitized resin coat.

25. The method as defined in claim 23 wherein said desensitizing agent comprises a mixture comprising a phosphate containing compound combined with a base.

26. The method as defined in claim 23 wherein in said second resin the molar content of reacted urea, formaldehyde and methanol and the molar ratio of reacted formaldehyde to methanol in the resin is within the range:

| | |
|---|---|
| Urea | mol 1 |
| $CH_2O$ | mols 2.4 |
| $CH_3OH$ | mols 1.5 |
| $CH_2O:CH_3OH$ | molar ratio 1.60. |

27. The method as defined in claim 23 wherein said second resin is substantially in the dimerictetrameric range.

28. The method as defined in claim 23 wherein said second resin contains up to about 0.5 mol of $C_2$–$C_6$ alkoxy substituents per urea residue therein.

29. The method as defined in claim 23 wherein the alkoxy substituents of said second resin comprise n-butoxy substituents.

30. The method as defined in claim 23 wherein said reactive resin comprises an epoxy resin.

31. The method as defined in claim 30 wherein:
said epoxy resin is selected from the group consisting of a glycidyl polyether of a dihydric phenol and an epoxy novolac.

32. The method as defined in claim 31 wherein:
said desensitizing agent comprises a phosphate compound combined with an alkali metal base.

33. The method as defined in claim 23 wherein said reactive resin is present in said resin mixture in an amount ranging from about 50 to about 90 weight percent.

* * * * *

UNITED STATES PATENT OFFICE
CERTIFICATE OF CORRECTION

Patent No. 4,065,316    Dated December 27, 1977

Inventor(s) W. J. Baron and P. J. Capano

It is certified that error appears in the above-identified patent and that said Letters Patent are hereby corrected as shown below:

In the specification, Column 10, line 53, "temperture" should read --temperature--. Column 11, line 22, "porduction" should read --production--; line 31, "activiating" should read --activating--. Column 12, line 2, "3,523,518" should read --3,532,518--; line 13, "need by" should read --need be--. Column 13, line 11, "EXAMMPLE" should read --EXAMPLE--. Column 14, line 58, "eqiuivalent" should read --equivalent--. Column 17, line 52, "As" should read --An--. Column 18, line 28, "proceure" should read --procedure--; lines 48 and 49, "weight patterned" should read --weight percent aqueous NaOH solution was employed to treat the ink patterned--.

In the claims, Column 20, claim 8, line 23, "subtituents" should read --substituents--; line 42, "comprising" should read --consisting--. Column 22, claim 19, lines 1 and 2, "wherin said secnd" should read --wherein said second--; claim 24, line 63, "soluton" should read --solution--.

Signed and Sealed this

Fourth Day of April 1978

[SEAL]

Attest:

RUTH C. MASON
Attesting Officer

LUTRELLE F. PARKER
Acting Commissioner of Patents and Trademarks